United States Patent [19]

Black et al.

[11] Patent Number: 4,575,234

[45] Date of Patent: Mar. 11, 1986

[54] STENCIL SCREEN EXPOSURE APPARATUS

[75] Inventors: James A. Black, Kent City; Gregory J. Munson, N. Muskegon, both of Mich.

[73] Assignee: General Research, Inc., Sparta, Mich.

[21] Appl. No.: 666,966

[22] Filed: Oct. 31, 1984

[51] Int. Cl.⁴ ............................................. G03B 27/20
[52] U.S. Cl. .................................. 355/91; 101/128.21; 248/362; 355/73; 355/76
[58] Field of Search .......................... 355/91, 76, 73; 248/362, 363; 269/21; 101/128.21, 128.1

[56] References Cited

U.S. PATENT DOCUMENTS

| | | | |
|---|---|---|---|
| 1,750,294 | 3/1930 | Bassist | 355/91 X |
| 2,066,890 | 1/1937 | Koppe | 355/91 X |
| 2,519,610 | 8/1950 | Sussin | 355/73 |
| 2,799,204 | 7/1957 | Blatherwick | 355/76 |
| 2,929,309 | 3/1960 | Young | 355/91 |
| 4,083,301 | 4/1978 | Black | 101/128.21 |

*Primary Examiner*—Richard A. Wintercorn
*Attorney, Agent, or Firm*—Price, Heneveld, Huizenga & Cooper

[57] ABSTRACT

A stencil exposure apparatus that includes a frame with central translucent stencil mounting surface. A plurality of generally flat, resilient, compressible seal elements extend between opposite sides of the translucent surface and are movably mounted on the frame in order to accommodate the stencil exposure apparatus to a variety of stencil dimensions. A stencil mounting bar is movably mounted on the frame and includes means for maintaining the orientation of the bar relative to the frame while the mounting bar is being moved.

16 Claims, 8 Drawing Figures

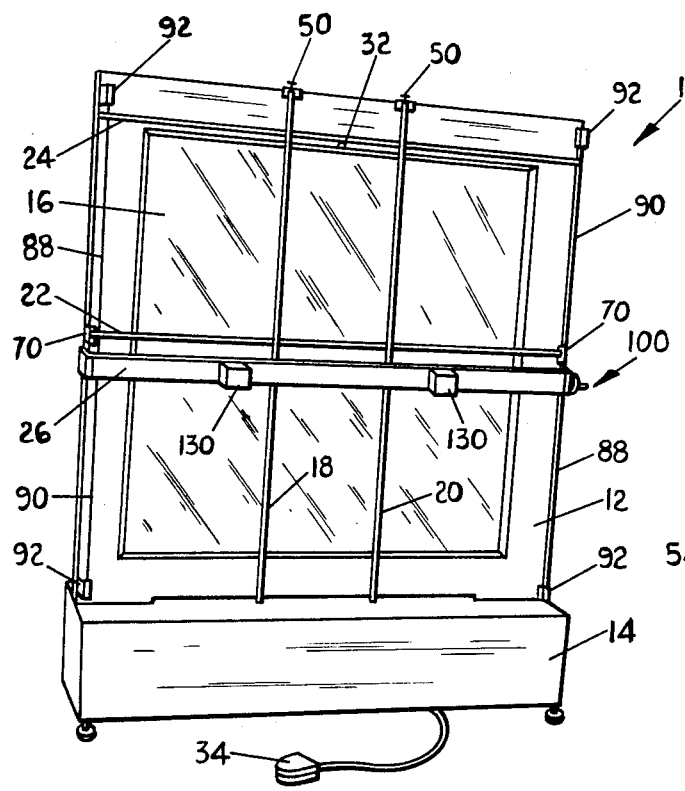
FIG. 1
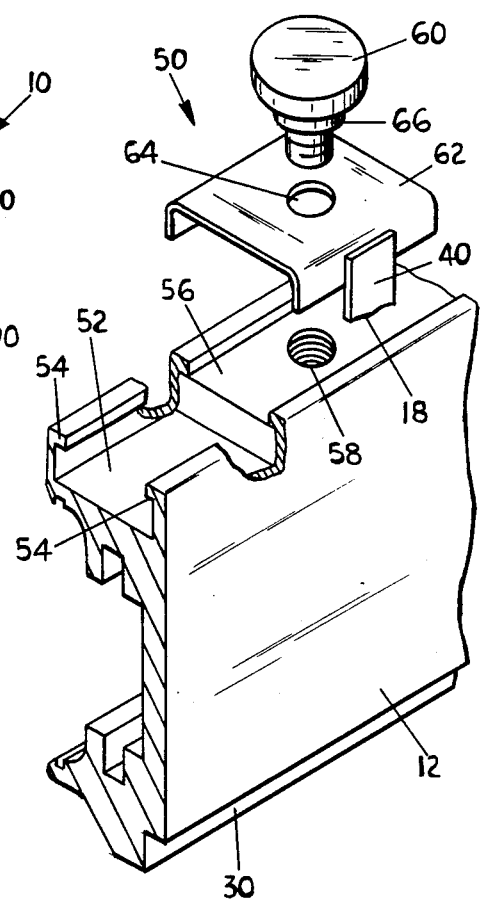
FIG. 2
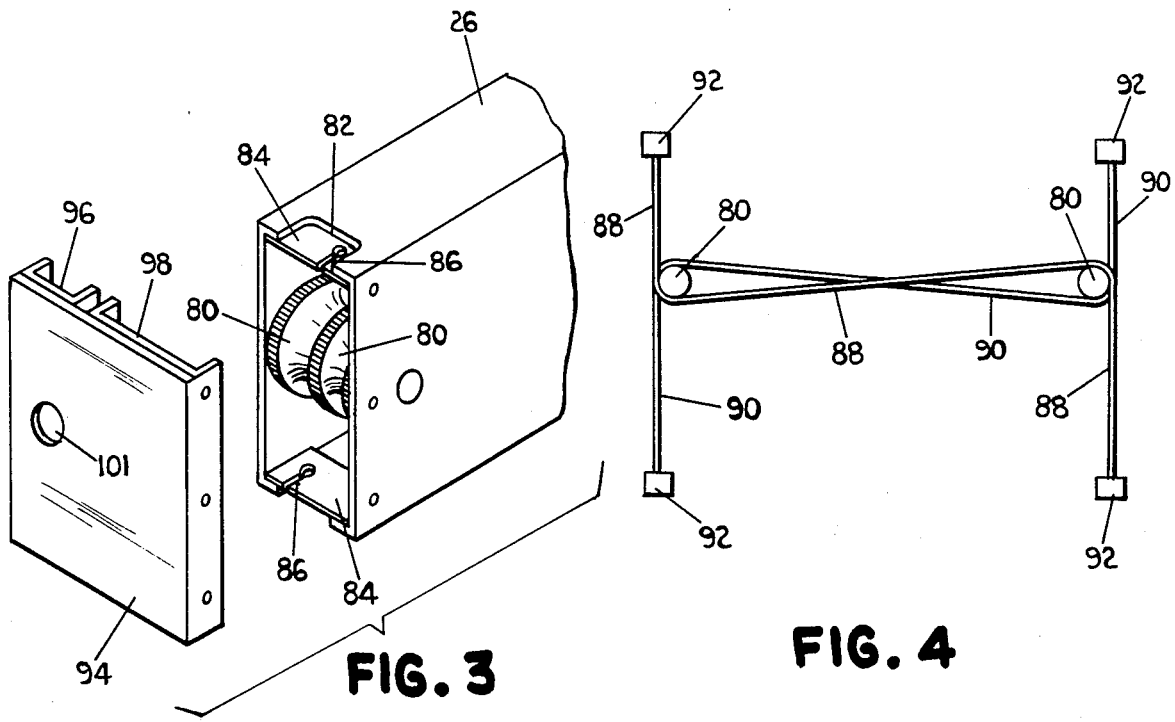
FIG. 3
FIG. 4

STENCIL SCREEN EXPOSURE APPARATUS

BACKGROUND OF THE INVENTION

The invention relates to screen stencil exposure apparatus.

The process of producing stencils on screens for use in stencil screen printing typically involves coating a chase mounted screen with a photo responsive emulsion, drying the coating, overlaying the coated fabric on a film positive, exposing pattern areas of the emulsion coating to light through the stencil pattern positive and subsequently developing the exposed emulsion to cause openings in the screen in the pattern desired. This prepared screen is used in the printing of conventional serigraphs by forcing stenciling fluid or ink through the openings to selectively coat the underlying stock.

Conventional apparatus for making these stencils normally includes a translucent, and preferably a transparent, surface on which the positive is mounted. A chase on which the emulsion coated screen is stretched is placed against the translucent surface and stencil positive, with the periphery of the area to be exposed sealed between the screen and transparent surface. Suction is typically used to draw the screen and the positive together in order to produce intimate contact and therefore accurate exposure on the screen.

Heretofore, various techniques have been used to produce the peripheral seal between screen and translucent surface. One such technique simply involves manually placing a peripheral rubber tube around the stencil area and then pressing the screen chase against the transparent surface. This manual positioning is time consuming and requires manual placement each time a new screen is exposed. Additionally, such manual mounting normally requires a generally horizontal work surface in order to support the tube.

In another method a peripheral groove is recessed into the support platform around the translucent surface. A rubber tube is mounted within this groove and therefore manual placement is obviated. However, the size of the space so encompassed cannot be varied so that the stencil area is limited to substantially one size.

One method of sealing a vertical exposure unit conventionally includes the placement of a rubber blanket over the apparatus and drawing a vacuum thereon. This method is cumbersome and not very versatile. Another successful method of providing the peripheral seal for both horizontal and vertical exposure units that does allow some variation in the stencil area involves the mounting of an endless resilient tube onto the support surface for the translucent surface. The tube is mounted by four corner brackets that are movable to a variety of mounting positions on the support surface, while either the resiliency of the tube or a change in tube size accommodates the reduction in stencil area. Although this method does provide for some variation of the stencil area, the variation is limited by the adaptability of the tubular seal.

SUMMARY OF THE INVENTION

The present invention is directed to a stencil exposure apparatus for use in preparing printing screens and the like that includes a frame that supports a translucent, preferably transparent stencil mounting surface. A vacuum port opens adjacent one edge of the translucent surface, and a plurality of generally flat, compressible and resilient seal elements extend between opposite sides of the translucent surface. The seal elements overlap each other and are movably mounted on the frame so that the seal elements may be moved across the face of the translucent surface. This permits the area encompassed by the seal elements to be varied in order to form a peripheral seal between the translucent surface and the screen mounted thereagainst that accommodates different size screens.

Further, the invention is also embodied in a screen mounting bar that is movably mounted on the frame so as to be movable across the face of the translucent surface. The mounting bar remains properly oriented relative to the frame while the bar is moved. The mounting bar also accommodates the stencil exposure apparatus to a wide variety of different sized screens and provides accurate registry of the screen and stencil due to the maintaining of proper orientation of the bar.

With the device of the present invention, the stencil exposure apparatus can be adapted to an almost infinite variety of screens having different dimensions. The seal elements are not restricted to preselected mounting locations so that the space encompassed by the seal elements is not limited to an incremental change in dimension. Further, with independently positioned seal elements the minimum dimension encompassed by the seal elements are not limited by the size of the seal element, and the encompassed area can therefore be reduced to zero.

Further, the seal elements and mounting bar can be quickly and easily changed without complicated remounting of the seal elements. The generally flat configuration of the seal elements reduces and nearly avoids any stretching of the screen when sealed, thereby obviating the distortion of the screen which would otherwise occur.

These and other objects, features and results of the invention will be understood by one skilled in the art from the written disclosure, claims and drawings herewith.

BRIEF DESCRIPTION OF THE DRAWINGS

FIG. 1 is a front perspective view of a stencil exposure apparatus embodying the present invention;

FIG. 2 is a fragmentary, exploded, perspective sectional view of the top edge of the stencil exposure apparatus frame of FIG. 1 with a seal element mounting clamp thereon;

FIG. 3 is a fragmentary, perspective view of one end of the screen mounting bar of FIG. 1, shown with the end guide bracket removed to expose the pulleys mounted therein;

FIG. 4 is a schematic view of the guide cables for the screen mounting bar assembled about the pulleys located within the ends of the screen mounting bar;

DETAILED DESCRIPTION OF THE PREFERRED EMBODIMENT

Figure 5:
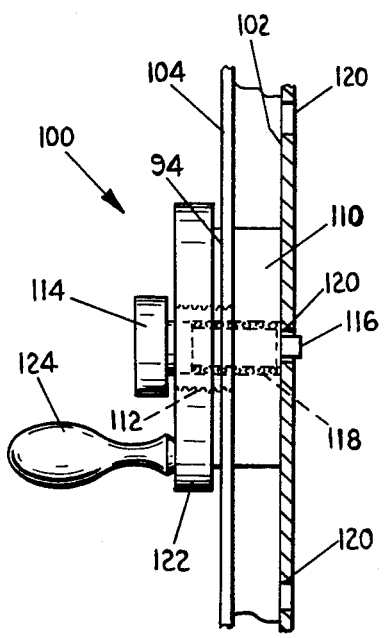
FIG. 5 is a rear elevational view of the positioning assembly for the screen mounting bar, shown with a fragmentary, sectional view of the side channel on the stencil exposure apparatus frame that the positioning assembly engages.

Shown in FIG. 1 is a stencil exposure apparatus, referenced generally by the numeral 10. Stencil exposure apparatus 10 includes a vertical support frame 12 that is mounted on a base 14. Frame 12 forms a peripheral support for a central translucent, most preferably transparent, surface or member 16. A pair of vertical seal elements 18 and 20 and a pair of horizontal seal elements 22 and 24 are mounted on frame 12 so as to extend between opposite sides of translucent surface 16. Seal elements 18-22 overlap and are movably mounted on frame 12 so as to encompass a variable area on the face of transparent surface 16 and thereby accommodate the screens of various dimensions. A horizontal stencil mounting bar or beam 26 is movably mounted on frame 12 in order to raise or lower across transparent surface 16 and thereby provide a supporting mount for screens of various dimensions.

More specifically, frame 12 is a rectangular aluminum member having a mounting lip 30 (FIG. 2) peripherally extending about the central opening. Lip 30 is used in the mounting of transparent surface 16 in a conventional manner. Immediately adjacent the top edge of transparent surface 16 intermediate the sides of frame 12 is a vacuum port or opening 32. Vacuum port 32 is used to create a suction between transparent surface 16 and the emulsion coated screen mounted adjacent thereto in order to produce intimate contact between the screen and a pattern positive mounted on surface 16. Vacuum port 32 is supplied a vacuum by a vacuum pump (not shown) located within base 14 and activated by vacuum control 34 in a conventional fashion. Translucent surface 16 is preferably a transparent glass surface, although it will be appreciated that other equivalent materials may be employed, for example the polymer marketed under the trade designation Plexiglas or the like. A light source (not shown) of conventional design is positioned behind translucent surfaces 16 and used in the exposure process.

Seal elements 18-24 are elongated, narrow strips of compressible, resilient foam material that are air impermeable and have a rectangular cross section so as to have a generally planar outer surface 40, FIG. 2. Seal elements 18-24 are not substantially thicker when compressed than the stencil pattern positive, so stretching of the screen over seal elements 18-24 is reduced to a minimal amount. The generally flat configuration of seal elements 18-24 cooperates with the ready compressibility of the seal element material to produce this narrow, minimal-screen stretching profile, and also permit vertical seal elements 18, 20 and horizontal seal elements 22, 24 to overlap in a criss-cross pattern without breaking the peripheral seal provided thereby. Seal elements 18-24 are preferably made from a closed cell foam material having a density of three pounds per cubic foot, and a twenty-five percent compression resistance of one pound per square inch. Seal elements 18-24 preferably have a cross sectional dimension of one-eighth inch thick by one half inch wide, although it will be appreciated that other alternative materials having sufficient resiliency, compressibility and impermeability characteristics to produce an effective seal may be utilized.

Horizontal seal element 24 is fixedly mounted on frame 12 immediately above vacuum port 32, FIG. 1. Since vacuum port 32 accesses the space encompassed by seal elements 18-24, so horizontal seal element is adhered to frame 12 to extend along the upper edge of translucent surface 16. Vertical seal elements 18, 20 and horizontal seal element 22 are movably mounted on frame 12 in order to provide variability to the space encompassed by the periphery seal.

As shown in FIG. 2, vertical seal elements 18 and 20 are each mounted on frame 12 by a clamp assembly 50. Clamp assemblies 50 operate on a rectangular channel 52 that extends along the length of the top edge of frame 12. At the top edge of the side walls forming channel 52 are a pair of inwardly extending lips 54 that partially enclose channel 52 and form a bearing surface for clamp assembly 50. For each clamp assembly 50 a rectangular clamp block 56 is slidably received through one end of channel 52 so as to be slidable along the channel's length. A threaded aperture 58 passes through block 56 and opens outwardly of channel 52 in order to receive a threaded bolt 60. An inverted "U" shaped clamp bracket 62 is slidably fitted over the top edge of frame 12 so as to rest against bearing lips 54. Clamp bracket 62 includes a central aperture 64 through which bolt 60 passes. Bolt 60 includes an enlarged bearing undersurface 66 that contacts clamp bracket 62, so that as bolt 60 is turned in clamp block 56, clamp block 56 and clamp bracket 62 will be pulled together and fixedly clamped onto lips 54. Seal elements 18, 20 are adhered to the front leg of clamp brackets 62 in order to depend across the face of translucent surface 16. Seal elements 18, 20 include weights (not shown) adhered to their lower ends which cause seal elements 18, 20 to remain taut across the face of translucent surface 16. Seal elements 18 and 20 may therefore be slid along the top of frame 12 and clamped into position at the desired location. Since vacuum port 32 must access the space encompassed by seal elements 18-24, one of vertical seal elements 18, 20 must be located on either side of vacuum port 32. In operation, therefore, each vertical seal element 18, 20 is not shifted across more than half of translucent surface 16.

As shown in FIG. 1, horizontal seal element 22 extends between side brackets 70. Side brackets 70 are similar in configuration to clamp bracket 62 and include a front leg to which seal element 22 is adhered. When seal element 22 is mounted on frame 12, seal element 22 is resiliently elongated in order to bias side clamps 70 against the side of frame 12. The resilient tension of seal element 22 maintains seal element 22 in position. Seal element 22 may therefore be stretched slightly in order to be shifted across the entirety of the face of translucent surface 16.

Figure 6:
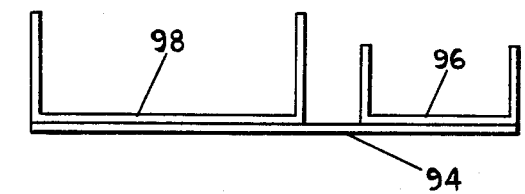
FIG. 6 is a top plan view of an end guide bracket for the stencil mounting bar.

Stencil mounting bar 26 is a hollow rectangular beam (FIG. 3) that extends between the side edges of frame 12. Beam 26 includes a mechanism for maintaining the horizontal orientation of beam 26 relative to frame 12. This mechanism includes a pair of pulleys 80 that are coaxially mounted on either end of beam 26. In both the top and bottom edges of either end of beam 26 are a notch 82, in which is welded a wire guide plate 84. In each wire guide plate 84 is cut a single keyhole slot 86. Keyhole slots 86 receive and act as a guide for a pair of wire cables 88 and 90 which are anchored at the top and bottom of frame 12 by anchors 92. Keyhole slots 86 are offset so that each pulley 80 has one keyhole slot 86 associated therewith. Cables 88 and 90 are assembled around pulleys 80 in the arrangement shown in FIG. 4. Cable 88 is anchored in the upper left corner of frame 12, passes under the left forward pulley 80, extends through bar 26, passes over the right forward pulley 80 and is anchored at the lower right corner of frame 12. Cable 90 is assembled in a mirror image pattern over the rear set of pulleys 80. So arranged, pulleys 80 traveling around cables 88 and 90 maintain bar 26 in a horizontal orientation as bar 26 is raised and lowered. A guide bracket 94 (FIG. 6) closes each end of bar 26. Each guide bracket 94 includes two spaced, "U" shaped channels 96 and 98, channel 96 fitting over the edge of frame 12 and channel 98 closing the end of bar 26. Guide brackets 94 slidably mount bar 26 on frame 12 and keep bar 26 in proper registry with translucent surface 16.

As shown in FIG. 5, a bar positioning assembly 100 is located on one side of screen mounting bar 26. Positioning assembly provides a means for clamping bar 26 in a fixed position on frame 12 and is mounted on an aperture 101 through one guide bracket 94, FIG. 3. A rectangular side channel 102 extends along the length of one side of frame 12. Side channel 102 is similar to top channel 52 and includes a pair of inwardly extending bearing lips 104 thereon that form a bearing surface for positioning assembly 100. Slidably received in side channel 102 is a rectangular clamp block 110 that is slidable along the length of channel 102. Extending from one side of clamp block 110 and projecting out of channel 102 is a cylindrical, threaded hollow post 112 that is threaded on its outer surface and has a central aperture that extends through clamp block 110. A sliding bolt 114 is received in thread post 112 that includes a narrow locking end 116. A spring 118 is secured to bolt 114 and clamp block 110 in order to bias bolt 114 inwardly of channel 102. A suitable bias bolt-spring plunger assembly is manufactured by Reid Tool Supply Co. of Muskegon, Mich. Spaced along the inner wall of channel 102 are apertures or recesses 120 that are complementary to locking end 116 and are located at common intervals along channel 102. Threaded post 112 slidably passes through the one guide bracket 94, so that when clamp block 110 is located adjacent a recess 120 narrow end 116 on bolt 114 is biased into recess 120. Bar 26 is thus fixed in position by bolt 114 in combination with cables 88, 90. Positioning assembly 100 also includes an alternative circular clamping disc 122 that includes a threaded central aperture. Thread post 112 is received through clamping disc 122, so that as clamp disc 122 is rotated, clamp disc 122 clamps guide bracket 94 and clamp block 110 together onto the bearing surface provided by lips 104. Clamp disc 122 is used to clamp mounting bar 26 in position at locations intermediate channel recesses 120 and therefore provides mounting bar 26 with an infinite range of positions on frame 12. Clamp disc 122 includes a handle 124 to facilitate tightening and loosening of positioning assembly 100.

On the forward surface of screen mounting bar 26 are a pair of mounting blocks 130. Mounting blocks 130 include upwardly opening recesses (not shown) in which a mounting bracket is received and is used to clamp a screen chase 140 (FIGS. 7, 8) against translucent surface 16. Screen chase 140 is supported on bar 26 and mounting blocks 130.

Figure 7:
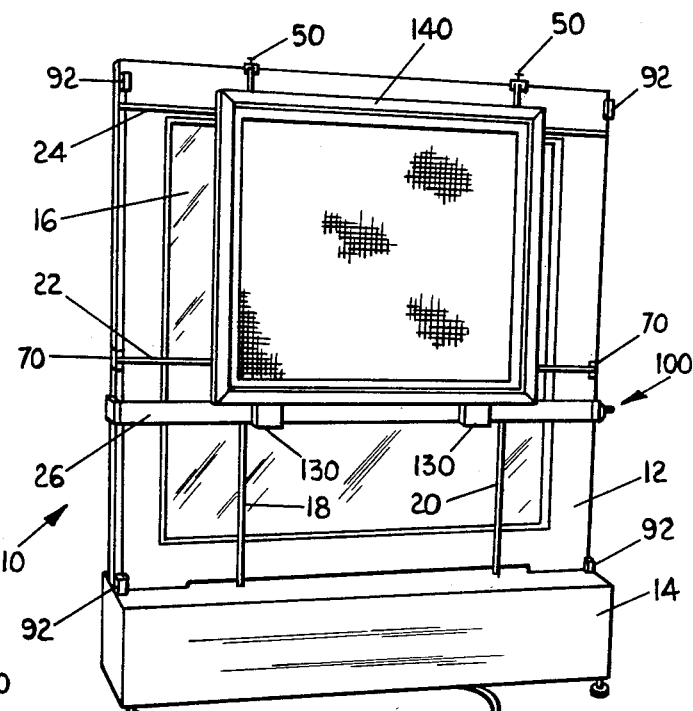
FIG. 7 is a front perspective view of the stencil exposure apparatus of FIG. 1, shown with a large screen mounted thereon.
Figure 8:
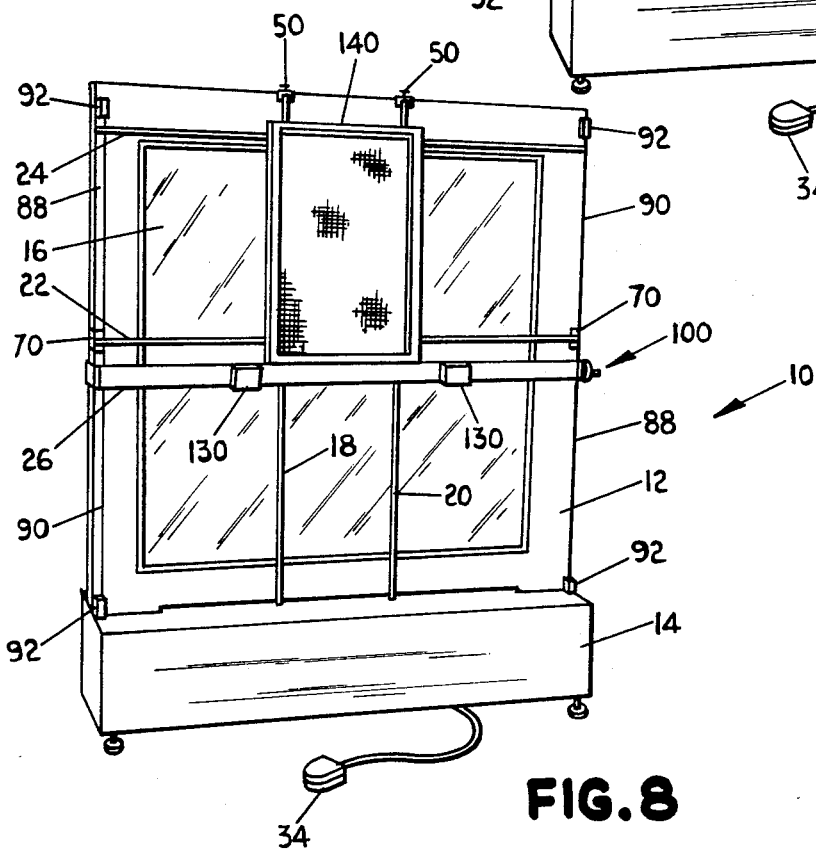
FIG. 8 is a front perspective view of the stencil exposure apparatus of FIG. 7, shown with a differently dimensioned screen mounted thereon.

As shown in FIGS. 7 and 8, stencil exposure apparatus 10 accommodates stencils of various sizes. Mounting bar 26 is raised or lowered in order to position the upper edge of stencil chase 140 above upper horizontal seal strip 24 and vacuum port 32. Bar 26 is fixed in position by positioning assembly 100, using either bolt 114 or clamping disc 122. Horizontal seal element 22 is moved to be located above bar 26 at the lower edge of the screen area to be sealed. Vertical seal elements 18 and 20 are spaced to enclose the stencil area and are clamped in place using clamp assemblies 50. With the use of stencil exposure apparatus 10, seal elements 18-22 may be quickly moved to the desired position and fixed in place, while mounting bar 26 can be quickly shifted to support chase 140 at an infinite number of positions.

It is to be understood that the above is merely a description of the preferred embodiment and that one skilled in the art will recognize that various improvements or modifications may be made without departing from the spirit of the invention disclosed herein. The scope of the protection afforded is to be determined by the claims which follow and the breadth of interpretration which the law allows.

The embodiments of the invention in which an exclusive property or privilege is claimed are as follows:

1. Stencil exposure apparatus comprising:
   a support frame having a translucent surface for supporting a stencil pattern thereon;
   means for positioning a stencil screen adjacent a stencil pattern on said translucent surface;
   means for applying a suction between said translucent surface and a stencil screen positioned adjacent thereto;
   a plurality of generally flat, compressible, resilient seal elements, each seal element being mounted on said frame to extend between opposite sides of said translucent surface, said seal elements overlapping in order to cooperate to form a periphery seal about the space on said translucent surface to which the stencil pattern is mounted; and
   at least one of said seal elements being movably mounted on said frame to be movable across at least approximately half of said translucent surface, whereby the area encompassed by said seal elements may be varied to accommodate stencil screens of various sizes and stretching with resultant distortion of the screen is reduced.

2. The stencil exposure apparatus of claim 1, wherein:
   said movably mounted seal element is movable across substantially all of said translucent surface.

3. The stencil exposure apparatus of claim 1, wherein:
   at least three of said seal elements are movably mounted on said frame.

4. The stencil exposure apparatus of claim 3, wherein:
   said suction means includes a suction passage through said frame opening adjacent one side of said translucent surface; and
   one of said seal elements being fixedly mounted to said frame adjacent said suction passage opening with said suction passage opening disposed between said fixedly mounted seal element and said translucent surface.

5. The stencil exposure apparatus of claim 1, wherein:
   said movably mounted seal element includes seal clamping means for selectively clamping said movably mounted seal element in position on said frame.

6. The stencil exposure apparatus of claim 5, wherein:
   said seal clamping means includes a channel extending along at least one edge of said frame, a seal clamp block slidably received in said channel and an engaging element selectively, fixedly engaging said clamp block with the wall of said channel.

7. The stencil exposure apparatus of claim 1, wherein:

said positioning means includes a screen support bar movably mounted on said frame to move across said translucent surface, said support bar including means for maintaining the orientation of said bar relative to said frame.

8. The stencil exposure apparatus of claim 7, wherein:
said orientation maintaining means includes at least one pulley on each end of said bar, and a pair of positioning cables anchored to said frame and passing around said pulleys.

9. The stencil exposure apparatus of claim 7, wherein:
said positioning means includes a bar clamping means for selectively clamping said bar in position on said frame.

10. The stencil exposure apparatus of claim 9, wherein:
said bar clamping means includes a channel extending along at least one edge of said frame, a bar clamp block slidably received in said channel and an engaging element selectively, fixedly engaging said clamp block with the wall of said channel.

11. Stencil exposure apparatus, comprising:
a vertical support frame having a translucent surface for supporting a stencil pattern thereon;
seal means for providing a periphery seal about the space on said translucent surface to which the stencil pattern is mounted;
suction means for applying a suction between said translucent surface and a stencil screen positioned adjacent thereto;
a support mounting bar movably mounted on said frame having means for mounting and supporting a stencil screen thereon and for positioning the stencil screen adjacent said translucent surface, said bar being movable across substantially all of said translucent surface; and
means for maintaining the orientation of said bar relative to said frame, whereby the position of said mounting bar is varied to accommodate the mounting of stencil screens of various sizes.

12. The stencil exposure apparatus of claim 11, wherein:
said orientation maintaining means includes at least one pulley mounted on each end of said bar, and a pair of positioning cables anchored to said frame and passing around said pulleys.

13. The stencil exposure apparatus of claim 11, wherein:
said mounting bar includes clamping means for selectively clamping said mounting bar in position on said frame.

14. The stencil exposure apparatus of claim 13, wherein:
said clamping means includes a channel extending along at least one edge of said frame, a clamp block slidably received in said channel and an engaging element selectively, fixedly engaging said clamp block with the wall of said channel.

15. The stencil exposure apparatus of claim 14, wherein:
said engaging element includes a threaded clamping handle located generally outside of said channel and threadedly received on said clamp block so as to clamp a side wall of said channel between said handle and said clamp block when rotated, and a positioning post extending through said clamp block and out of said channel, said positioning post including bias means for biasing said positioning post into said channel; and
said channel includes a plurality of spaced post recesses therein, said post recesses positioned to receive said positioner post therein when said clamp block is located adjacent thereto.

16. The stencil exposure apparatus, comprising:
a vertical support frame having a translucent surface for supporting a stencil pattern thereon;
four resilient seal elements, each said seal element being mounted on said frame to extend between opposite sides of said translucent surface, said seal elements cooperating to form a periphery seal about the space on said translucent surface to which the stencil pattern is mounted;
suction means for applying a suction between said translucent surface and a stencil screen positioned adjacent thereto;
at least three of said seal elements being movably mounted on said frame to be movable across substantially all of said translucent surface;
a support mounting bar movably mounted on said frame, said support mounting bar having means for mounting and supporting a stencil screen thereon and for positioning the stencil screen adjacent said translucent surface, said support mounting bar being movable across substantially all of said translucent surface; and
means for maintaining the orientation of said bar relative to said frame, whereby said movably mounted seal elements and said support bar may be moved relative to said frame in order to accommodate the stencil exposure apparatus to stencil screens of various sizes.

* * * * *